United States Patent [19]
Wilson

[11] 3,772,724
[45] Nov. 20, 1973

[54] COMPACT WRAP-AROUND CAR WASH BRUSH APPARATUS

[76] Inventor: Earl E. Wilson, 1328 Newport Ave., Long Beach, Calif. 90804

[22] Filed: Dec. 30, 1971

[21] Appl. No.: 214,156

[52] U.S. Cl. ............................. 15/21 D, 15/DIG. 2
[51] Int. Cl. .............................................. B60s 3/06
[58] Field of Search ...................... 15/DIG. 2, 21 D, 15/21 E, 53, 97

[56] References Cited
UNITED STATES PATENTS
3,350,733   11/1967   Hanna .................................. 15/21 D
3,434,172   3/1969    Wilson ................................ 15/21 D
3,626,537   12/1971   Wilson ................................ 15/21 D Primary Examiner—Edward L. Roberts
Attorney—William H. Maxwell

[57] ABSTRACT

This invention relates to automobile washing wherein right and left hand brushing units traverse the substantially vertically disposed planar surfaces of the vehicle body and particularly the front, both sides and back surfaces, and wherein the said right and left hand units carrying the brushing apparatus are each characterized by articulated inner and outer arms supported from a stationary stand and carrying powered brush means that engage the surfaces being washed so as to articulate the apparatus into movement over said surfaces. In accordance with this invention the said right and left hand brushing units are placed at closely related sequential stations along the car wash alley, so that the single brushes of the two units respectively occur one behind the other when at the center of said alley, and characterized by the overlapping arms of the two units operating at separate elevations, while the brushes of the two units operate at a common elevation.

6 Claims, 14 Drawing Figures

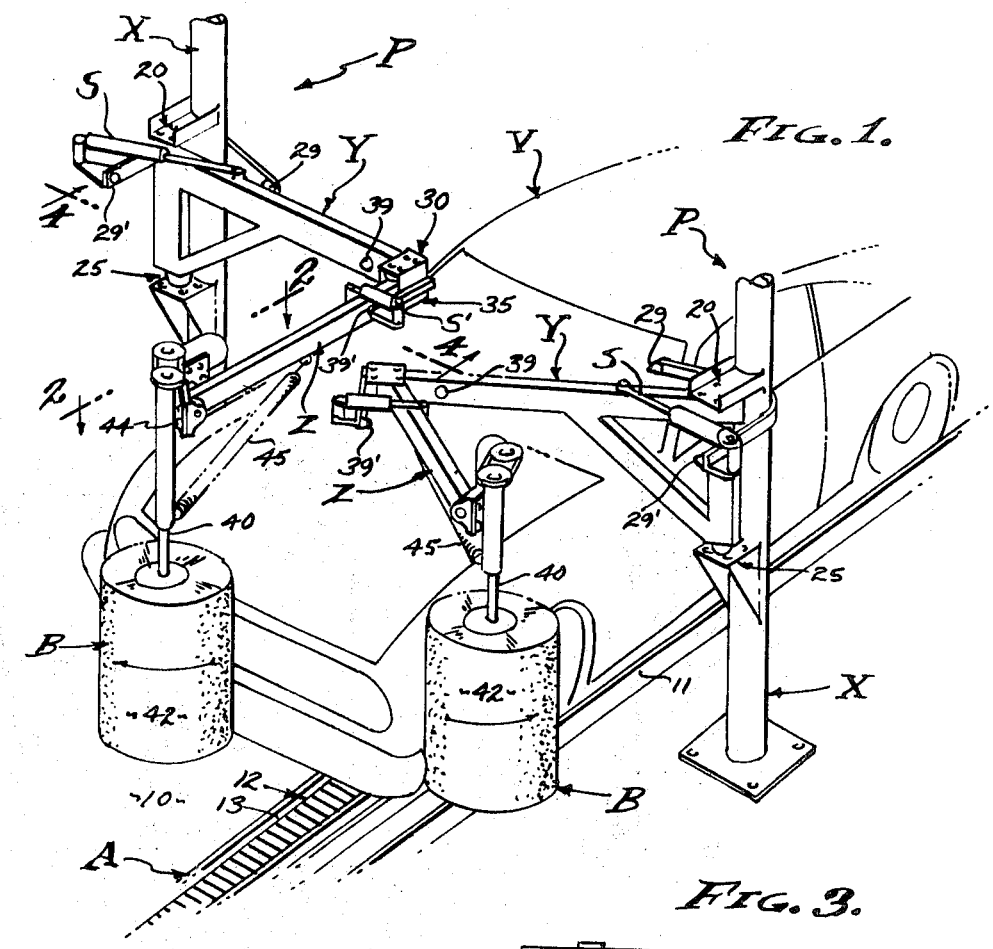
Fig. 1.
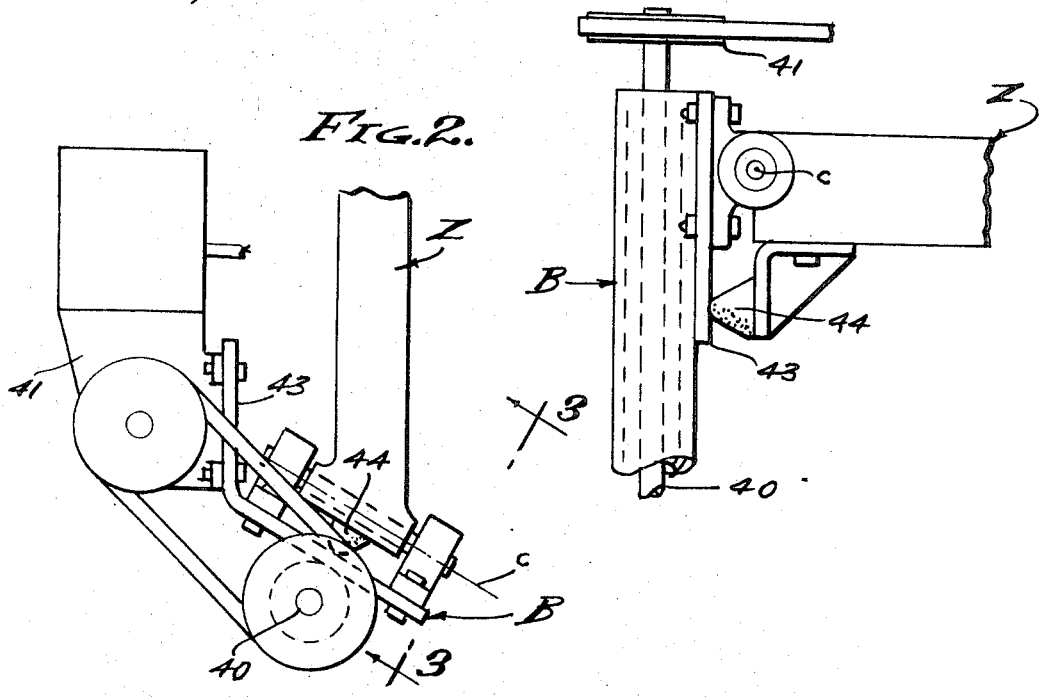
Fig. 2.
Fig. 3.

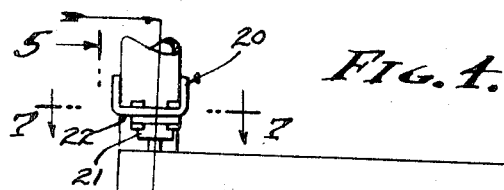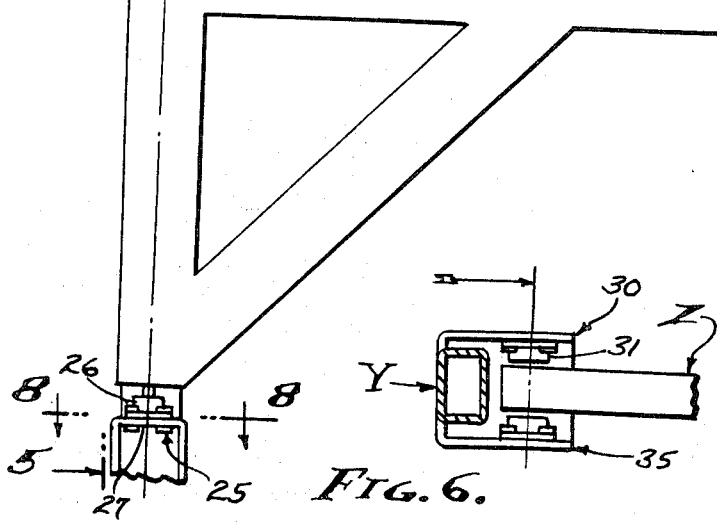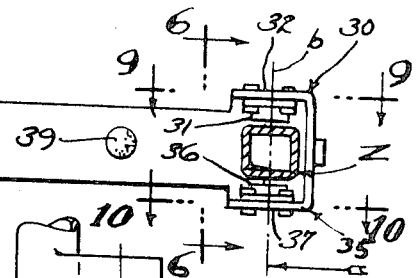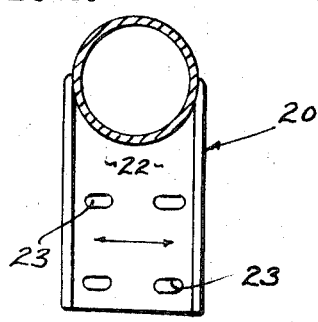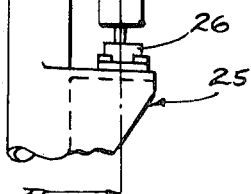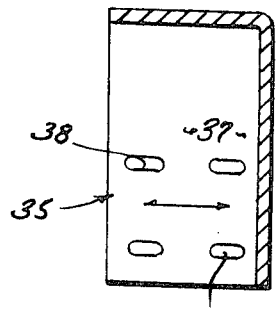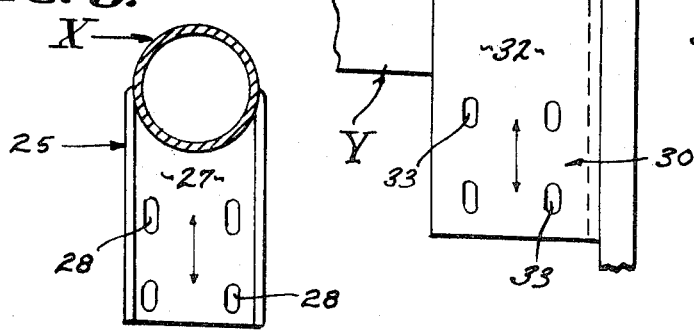

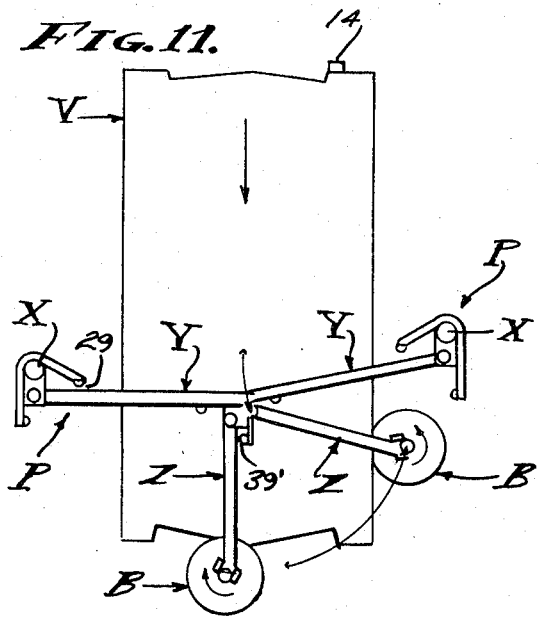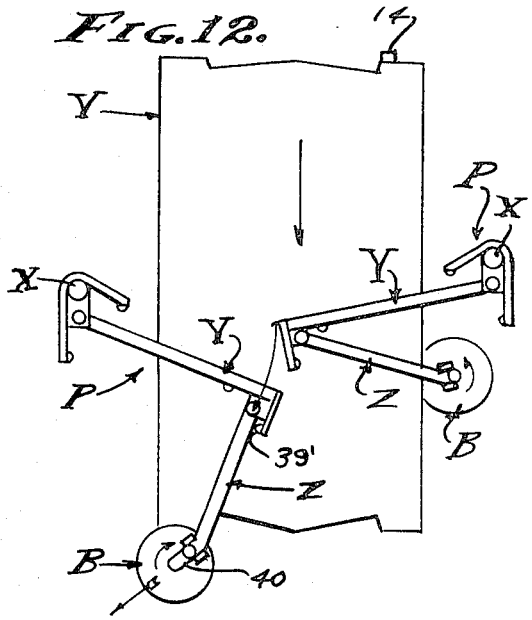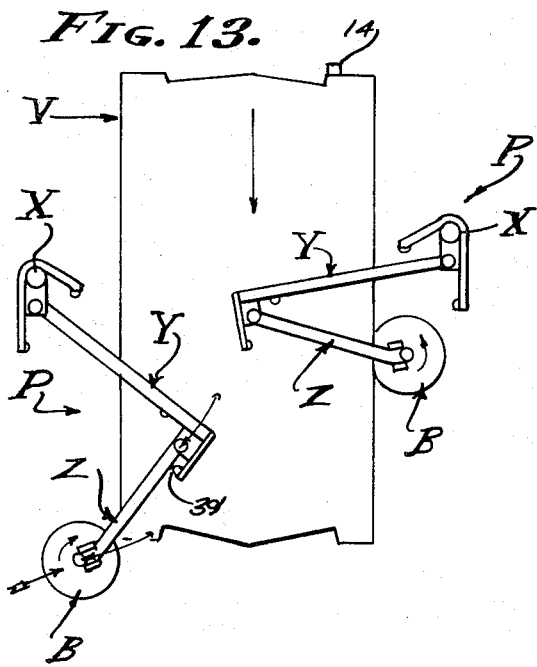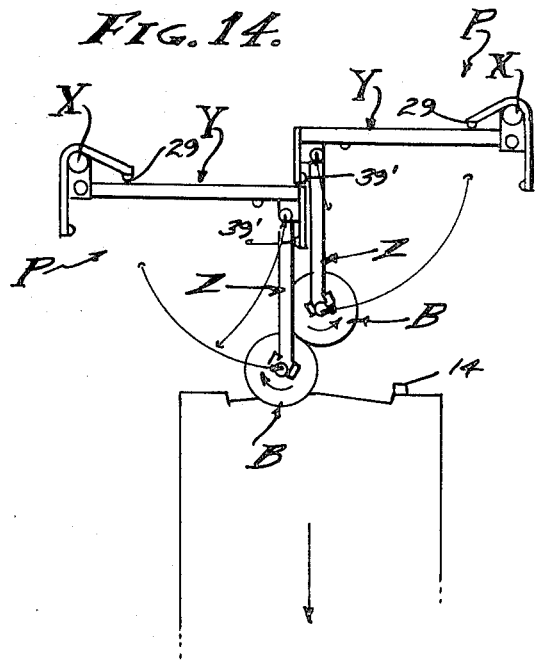

COMPACT WRAP-AROUND CAR WASH BRUSH APPARATUS

BACKGROUND

The washing of automobiles has been automated and brushing units are available to wash the front, sides and back of the vehicle body. In order to accomplish automated brushing, the present state of this art provides a pair of complementary brushing units disposed in sequential order to scrub from the center and along the sides of the automobile. The two brushing units that I make reference to are essentially right and left hand units of identical construction installed at opposite sides of an alley and each of which scrubs from the center of the automobile outwardly, longitudinally and then inwardly back to said center. The prior art provides such units with articulated arms, and it is customary to bias the arms in directions which cause the powered brush means of the apparatus to yieldingly engage the surfaces of the automobile to be washed.

FIELD OF THE INVENTION

A deficiency of such apparatus is the size and space required for installation; not only is each unit of substantial length, but here-tofore each unit has been spaced longitudinally from the other so as to ensure individual operation without interference one from the other. Consequently, the installation of right and left hand sequentially operating units has been space consuming, resulting in lengthy car wash alleys and correspondingly lengthy times involved in washing. For example, a normal rate of travel of automobiles through such a washing apparatus is approximately 20 feet per minute, in which case the present invention with approximately 4 feet of forshortening provides, more or less, a 20 percent saving in wash time for each automobile processed therethrough. Thus, the space saving and time saving are general objects of the present invention and the one inherently enhances the other.

Car wash brushing units of the type under consideration and involving articulated over head swinging arms are operated in right and left hand pairs, it being an object of this invention to interrelate the arms of such a pair of units whereby they coact to provide compactness and longitudinal forshortening of the apparatus with a commensurate saving in operational time required in the car wash function. With the present invention, the arms of complementary right and left hand units operate at separate elevations, one overlying the other, while the brush means of the two units operate at a common level without interferring one with the other. In practice, the brush means of the two units have a normal inactive position at the center line of the car wash alley and are immediately adjacent the other without touching during operation.

PRIOR ART: The prior art is typified by the Letters Patent to D. C. Hanna U.S. Pat. No. 3,350,733 and to E. E. Wilson U.S. Pat. Nos. 3,434,172 and 3,626,537; all of which disclose car washing devices wherein one or more brush units is carried on its vertically disposed axis to traverse the side panels, front and back of a car body by means of articulating horizontally disposed arms. It is common practice, as disclosed by the prior art, to place the units in non-interferring areas so that the progressive movements of one brushing unit do not interfere with the other, and consequently, the prior art installations of such apparatus are space consuming and the time elapsed in transporting an automobile therethrough is correspondingly time consuming.

SUMMARY OF INVENTION

The car wash brushing apparatus that I provide is adapted to scrub all four sides of automobiles compensating for variations in size and body shape, there being right and left hand primary brushing units P installed at opposite sides of an alley A through which the vehicle V is transported. It is significant that the right and left hand brushing units P are of the same construction whereby a general description of one will suffice for both, said two units P being mirror opposites of each other with the arms thereof installed at separate levels and with the spindle axes of the two brush means offset longitudinally sufficient to avoid interference.

DRAWINGS

The various objects and features of this invention will be fully understood from the following detailed description of the typical preferred form and application thereof, throughout which description reference is made to the accompanying drawings, in which:

FIG. 1 is a perspective view illustrating a typical installation of the car wash brushing apparatus. FIG. 2 is an enlarged plan view of one of the releasable brush means taken as indicated by line 2—2 on FIG. 1. FIG. 3 is a view taken as indicated by line 3—3 on FIG. 2. FIG. 4 is an enlarged view taken as indicated by line 4—4 on FIG. 1. FIGS. 5 and 6 are views taken as indicated by lines 5—5 and 6—6 on FIG. 4. FIGS. 7 and 8 are enlarged detailed views taken of the inner arm support plates as indicated by lines 7—7 and 8—8 on FIG. 4. FIGS. 9 and 10 are enlarged detailed views taken of the outer arm support plates as indicated by lines 9—9 and 10—10 on FIG. 4. And FIGS. 11 through 14 are diagrammatic plan views showing the principal conditions of the apparatus as they occur during operation thereof.

PREFERRED EMBODIMENT

Referring to FIG. 1 of the drawings, the vehicle V is shown as a typical present day automobile, a sedan, that is being transported through the alley A which comprises a driveway 10 with wheel guides 11 and conveyor 12. The driveway 10 is a longitudinal road that is paved and adapted to support the vehicle for rolling engagement forwardly through the car wash with or without the aid of the conveyor. That is, the vehicle V can be driven through the car wash and simply guided by the wheel guides 11. The wheel guide 11 is an elongate unit that receives the vehicle at the entry to the alley A, the conveyor 12 transports the vehicle throughout the length of the alley, and the vehicle is thereby delivered at the terminal end of the alley. The conveyor 12 can vary widely as circumstances require and, for example, can be a moving chain with hooks to engage and pull the vehicle, or it can be an automatic conveyor with rollers within the confines of the wheel guides 11 to engage the vehicle wheels to roll forwardly, and is shown in a typical form as a pusher-bar conveyor having a channel disposed longitudinally of or in the driveway 10, at and/or just inboard of the left hand wheels of the vehicle V. The conveyor channel houses a conveyor chain 13 or the like, and the pusher-bar 14 projects upwardly from the driveway to engage behind the rear bumper of the vehicle, immediately inboard of the left rear wheel. It is to be understood that the car wash per se may include, when desired, the other required pieces of equipment such as, for example, soap and/or water sprays, hood and top brushing units, and dryers (not shown).

A brushing unit P is installed at each side of the vehicle, there being opposite right hand and left hand units. Consequently, a normal installation involves a unit P at the right and a unit P at the left of the alley A. As shown, the two brushing units P are positioned so as to engage the vehicle V at nearly the same time, but arranged so that the brushing engagement of one unit immediately precedes that of the other, whereby the brushes of the two separate units do not interfere one with the other when their bristles are whipped radially by centrifical action. For example, and in the preferred relationship, the brush of the left hand brushing unit P is first to engage the advancing vehicle V followed by engagement of the brush of the right hand brushing unit P. Consequently, the brushing functions of the two separate units P can overlap at the centerline of alley A without interferring with each other.

The brushing unit P, right or left, involves generally a mounting standard X, an inner arm Y pivotally carried by the standard, an outer arm Z pivotally carried by the first mentioned inner arm, and a releasable brush means B carried at the active or live end of the outer arm Z. The inner arm Y normally extends transversely of the alley A substantially at a right angle to the direction of travel of the vehicle being washed, while the outer arm Z normally extends at a right angle to and forwardly from the first mentioned arm. The said inner and outer arms Y and Z are disposed to extend horizontally and overhead above the vehicle V, and the powered brush means B normally depends vertically from the terminal end of the outer arm Z. As shown, the pivoted axes of the arms Y and Z are displaced from the perpendicular in order to effect the actuation of the apparatus when the powered brush means B is activated. The brush means B is pivoted to the terminal end of the arm Z so as to be releasable for safety purposes as later described.

The mounting standard X is a column located at the side of the alley A, and to the side of the vehicle V to be moved through the alley. For example, the mounting X can extend from the floor of the alley A to the ceiling, or otherwise braced, so as to be firm and secure. It is important that the standard X be perpendicular and plumb, so as to carry upper and lower journal means 20 and 25 in true vertical alignment. The journal means 20 and 25 are of complementary construction, being carried by the standard X in spaced opposition to each other, the axis $a$ thereof being adapted to be displaced inwardly at its upper end and forwardly at its lower end, so as to establish an angle of depression that causes the inner arm Y (next to be described) to swing inwardly and rearwardly against a stop 29 from which it is free to be forcibly withdrawn.

The inner arm Y is pivotally carried on the angularly depressed axis $a$ by said adjustable journal means 20 and 25 and extends (declining) horizontally inward to the center of and/or toward the opposite far side of the vehicle over which it swings. The inner arm Y is a rigid structure that usually articulates about 45° as shown in FIG. 12, from the stop 29 and 90° to a limiting stop 29', being powered for return to stop 29 by means of gravity as controlled by the adjusted depression of the axis $a$.

In normal use the inner arm Y swings through an arc of somewhat less than 95°. Thus, the inner arm Y is yieldingly urged to the normal transverse position shown for example by the foremost unit in FIG. 11. In practice, the inner arm Y is about 6 feet in length, is stopped at 3° (or more) rotative displacement in the direction of travel, the height of the outer swinging end of the arm is adjusted at the upper journal means 20 to be approximately 1½ inches lower than at the axis $a$, and the lower journal means 25 (3 feet below the upper journal) is adjusted approximately 1½ inches forwardly in the direction of travel and displaced from the perpendicular. It will be apparent that these journal adjustments can be varied depending upon the desired force of return to stop 29. A shock absorber or motion damper S is provided to control the speed of operation (see FIG. 1).

The outer arm Z is pivotally carried on a second pivotal axis $b$ by upper and lower journal means 30 and 35 at the swinging end of the first described inner arm Y. The said journal means 30 and 35 are opposed to each other in normal alignment at the terminal end of the inner arm Y, projecting laterally from and at a normal angle to the inner arm in the direction of travel. The journal means 30 and 35 are of complementary construction, being carried by the inner arm Y in spaced opposition to each other, the axis $b$ thereof being adapted to be displaced forwardly at its upper end and outwardly at its lower end, so as to establish an angle of depression that causes the outer arm Z to swing inwardly against a stop 39 from which it is free to be forcibly withdrawn.

The outer arm Z is pivotally carried on the angularly depressed axis $b$ by said adjustable journal means 30 and 35 and extends horizontally forward at a right angle from the inner arm Y. Like the inner arm Y, the outer arm Z also swings over the vehicle, being disposed in substantially the same plane of movement as the first mentioned inner arm. The arm Z is a rigid structure that articulates not more than about 90° as shown, from the stop 39 to a limiting stop 39', being powered for return to the stop 39 by means of gravity controlled by the adjusted depression of the axis $b$. In normal use, the outer arm Z is yieldingly urged to the normal forwardly extended position and/or normal to arm Y as shown for example by the foremost unit in FIG. 11. In practice, the outer arm Z is about 5 feet in length, it is at a slightly obtuse angle 3° relative to arm Y, the upper journal means 30 is adjusted to lower the height of the outer swinging end of the arm and the lower journal means 35 is adjusted to move the lower end of axis $b$ outwardly so as to control its depressive action, substantially as above described concerning inner arm Y so as to power the return to stop 39. For instance, in order to increase pressure of the brush means against the vehicle body, the upper journal 30 is adjusted to lower the arm Z, and the lower journal means 35 is adjusted outward from the perpendicular as may be required. A shock absorber or motion damper S is provided to control the speed of operation (see FIG. 1.)

The releasable brush means B is a powered means, comprising a vertically disposed spindle 40 that is revolved by a drive 41. The brush 42 thereof is made up of a cylindrical core that has flexible bristles which flail outwardly by action of centrifugal force so as to impinge and wipe upon the vehicle body with a brushing action. The brush 42 of the right hand unit revolves clockwise (in plan view) while the brush 42 of the left hand unit revolves counter clockwise, and in accordance with the invention the spindle 40, electric motor and gear drive 41 and brush 42 are supported on a frame 43 that is pivotally carried on an axis c at the terminal end of the outer arm Z. Thus, the powered brush means B is a self-contained unit. The drive 41 revolving the spindle 40 with the brush 42 operative at its lowermost end. Axis c is disposed horizontally and transversely of the outer end of arm Z and there is a stop 44 on the arm that limits rearward movement of the spindle 40 to a perpendicular position, normal with relation to the arm Z, and which permits free forward and/or outward swinging thereof. Preferably, the pivotal axis c is disposed diagonally so that the spindle 40 swings outwardly and away from the center of the vehicle V. In practice the axis c is pitched about 30° as shown, and this position is most effective in release of the brush means B throughout the critical front end contours of usual vehicle bodies (see FIGS. 11-14). Gravity holds the spindle 40 in a depended position with the frame against the stop 44, and a spring 45 is provided to supplement this action and secure the powered brush means proper working position and against bouncing off of the stop 44.

In accordance with this invention, I provide for the planar separation of the arms Y and Z of one brushing unit P relative to the arms Y and Z of the other brushing unit P. That is, elevational separation is provided and maintained between the articulated arms of the two independently operable units P respectively. Referring now to FIG. 1 of the drawings, it will be observed that the first brushing unit P engageable with the car body is (by choice) the left hand unit, and the second brushing unit P engageable with the car body is the right hand unit; and accordingly the articulating arms of the first mentioned unit P are operable in a lower plane while the articulating arms of the second mentioned unit P are operable in an upper plane. As a consequence, the outer arms Z of the two brushing units P occur one above and/or below the other when the said units are at rest in their normal inactive positions with the brush means B thereof located at or near the center line of the alley A, in each instance. In practice, the bristles of the brush means B are depressed when engaged against the vehicle body and a widened area of body is thereby brushed, and which results in brushing overlap. Therefore the mounting standard X at the left side of the alley A carries the journal means 20 and 25 at spaced levels so as to place the arms Y and Z of left hand unit P in the said lower plane, while the mounting standard X of the right side of alley A carries the journal means 20 and 25 at spaced levels to place the arms Y and Z of right hand unit P in the said upper plane. The said lower and upper planes are well separated, and the arms Y and Z are in each instance articulated well above the top of the vehicle to be washed, and it is the spindles 40 of the two brush means B that are of diverse length or height, one being short and the other long. As shown, it is the left hand brush means B which has the shortened spindle 40 and it is the right hand brush means B which has the lengthened spindle 40, and in each instance the arms Y and Z of the two units operate exclusively in their respectively reserved planes of movement.

From the foregoing it will be seen that actuation of the arm Y and Z is in each brush unit P dependent upon the presence of a vehicle body and rotation of the brushes 42. Firstly, the vehicle V is moved into engagement with the brush 42 of the left hand brush unit P positioned immediate to the brush of the right hand unit. The brush 42 of the left hand unit commences scrubbing from the center out and along the left side of the vehicle and immediately followed by movement of the vehicle V into engagement with brush 42 of the right hand brush unit P which commences scrubbing from the center out and along the right side of the vehicle thereof (see FIGS. 11-14). FIG. 14 illustrates the immediate location of the two brushes 42 relative to each other while awaiting engagement by the vehicle V. Secondly, and referring now to the left hand unit P, the vehicle V continues to advance and which results in traverse of its brush 42 to the far left front corner of the vehicle as a result of bodily displacement of both inner and outer arms Y and Z. Thirdly, the vehicle V continues to advance and which results in the escape of the left hand brush 42 from the front to the left side of the vehicle and which results in scrubbing the said left side of the vehicle body and whereupon the rearward gravitational bias upon the arm Y causes the brush 42 to engage said left side of the vehicle body. Fourthly, the vehicle V continues to advance and which results in the escape of the brush 42 from the left side to the back of the vehicle and which permits the inner arm Y to reach the stop means 19 so as to cause the gravitational bias upon outer arm Z to move the brush 42 into engagement with the back of the vehicle body (see FIG. 14). Fifthly and finally, the vehicle V continues to advance and which causes the continued traverse of the brush 42 to the center or toward the right side of the vehicle V where the core of the brush 42 is restricted as by means of the stops 19 and 29 (see FIG. 14). The brushes 42 revolve as shown in order to have traction and to activate movement thereof against the side of the vehicle body, and so as to wipe and/or scrub around and into the various corners of the vehicle.

It will be understood that the left and right hand units P operate the same, as shown in FIG. 11-14; and in accordance with the invention the arms Y and Z of the left hand unit P swing in one exclusive plane preferably the lowermost plane, while the arms Y and Z of the right hand units P also swing in another exclusive plane preferably the uppermost plane. It is by means of this planar separation of the articulated arms that the expansive spacing of the brushing units P heretofore controlled by the arcuate extent of the arms is now controlled by the diameter of the two brushes 42. In practice, the two brushes 42 operate at a common elevation and are positioned immediately near each other even so as to touch and/or depress one into the other, since their revolvements are compatable. Also, the spindle axes 40 of the two brushes 42 can be offset to opposite sides of the alley center line as shown in FIG. 14, utilizing depression of the brush bristles in order to reach to and across the center of the vehicle body. However, the width of the alley A will dictate the location of the right and left hand units P, so that in some instances the brush means B of the two units will overlap. In other words, contrary to the showing of FIG. 14 the two brush means B can occur one directly behind the other, or their right and left positions reversed from the example shown; there being no restriction to the amount of brush overlap to the right or left with respect to each other. As a consequence, the combined two brushing units P are closely spaced, accompanied by a commensurate saving in elapsed time in the transport of vehicles through the brush units.

Having described only a typical preferred form and application of my invention, I do not wish to be limited or restricted to the specific details herein set forth, but wish to reserve to myself any modifications or variations that may appear to those skilled in the art:

I claim:

1. A car wash brushing apparatus for scrubbing the front, both sides and back of a vehicle body and comprised of a pair of like right and left hand brushing units operable from the center of the vehicle body and along the right and left sides thereof respectively, and each unit including; a mounting at its respective side of the vehicle and having a vertically disposed first pivotal axis, an inner arm carried by said first pivotal axis and mounting therefor to swing horizontally to a normal transversely disposed position extended over the vehicle body and having a vertically disposed second pivotal axis at its swinging end remote from the first pivotal axis, stop means faced in the direction of movement of the vehicle to limit rearward movement of the inner arm caused by return means yieldingly urging said arm toward said stop means, an outer arm carried by said second pivotal axis and inner arm to swing to a position extended forwardly over and in the direction of movement of the vehicle, stop means faced toward the mounting and carried by the inner arm to limit outward swing of the outer arm caused by return means yieldingly urging said arm toward said stop means, and brush means rotatable on a vertically disposed axis depending from the swing end of the outer arm with power means revolving the brush means in a direction for engageable traction sequentially from the center to the side, along the side to the back, and across the back to the center of the vehicle body as a result of transport of the vehicle body forwardly to pass by said brushing unit; the arms of the right and left hand brushing units being disposed to swing in separate overlapped planes with the outer arm of one brushing unit aligned substantially beneath the outer arm of the other brushing unit when the said inner and outer arms of both brushing units are against said stop means therefor, and the said brush means of the right and left hand brushing units being rotatably engageable with the vehicle body at a common elevation.

2. The car wash brushing apparatus as set forth in claim 1 wherein both the inner and outer arms of the right and left hand brushing units swing in separate overlapped planes.

3. The car wash brushing apparatus as set forth in claim 1 wherein the brush means of the right and left hand brushing units are immediately adjacent one behind the other when the said inner and outer arms of both the right and left hand brushing units are against said stop means therefor.

4. The car wash brushing apparatus as set forth in claim 1, wherein both the inner and outer arms of the right and left hand brushing units swing in separate overlapped planes, and wherein the brush means of the right and left hand brushing units are immediately adjacent one behind the other when the said inner and outer arms of both the right and left hand brushing units are against said stop means therefor.

5. The car wash brushing apparatus as set forth in claim 1 wherein the first mentioned mountings of the right and left hand brushing units are sequentially stationed with the brush means of the right and left hand brushing units immediately adjacent one behind the other.

6. The car wash brushing apparatus as set forth in claim 1 wherein the first mentioned mountings of the right and left hand brushing units are sequentially stationed with the brush means of the right and left hand brushing units immediately adjacent one behind the other when the said inner and outer arms of both the right and left hand brushing units are against said stop means therefor.

* * * * *